US008338323B2

(12) United States Patent
Takasu et al.

(10) Patent No.: US 8,338,323 B2
(45) Date of Patent: Dec. 25, 2012

(54) ELECTRODE FOR ELECTROCHEMICAL REACTION AND PRODUCTION PROCESS THEREOF (75) Inventors: Yoshio Takasu, Nagano (JP); Wataru Sugimoto, Nagano (JP); Tatsuya Ohashi, Nagano (JP); Junfeng Zhang, Nagano (JP)

(73) Assignees: Permelec Electrode Ltd., Kanagawa (JP); Shinshu University, Nagano (JP)

( * ) Notice: Subject to any disclaimer, the term of this patent is extended or adjusted under 35 U.S.C. 154(b) by 77 days.

(21) Appl. No.: 12/878,620

(22) Filed: Sep. 9, 2010

(65) Prior Publication Data
US 2011/0226616 A1 Sep. 22, 2011

(30) Foreign Application Priority Data
Mar. 9, 2010 (JP) ................ P.2010-051996

(51) Int. Cl.
*H01M 4/88* (2006.01)
*H01M 4/96* (2006.01)
*C25B 11/08* (2006.01)
*C25B 11/12* (2006.01)

(52) U.S. Cl. ........ 502/101; 502/184; 502/185; 429/524; 429/525; 429/526; 429/527; 429/528; 429/532; 429/534; 204/284; 204/290.15; 204/290.14; 204/294

(58) Field of Classification Search ............... 502/101, 502/184, 185; 429/524–528, 532, 534; 204/284, 204/290.01, 290.14, 290.15, 294
See application file for complete search history.

(56) References Cited

U.S. PATENT DOCUMENTS
2004/0202602 A1  10/2004  Masa-aki et al.
2007/0212594 A1*  9/2007  Takasu et al. .......... 429/44

FOREIGN PATENT DOCUMENTS

| JP | 58-160860 A | 9/1983 |
|---|---|---|
| JP | 07-299467 A | 11/1995 |
| JP | 2574699 B2 | 1/1997 |
| JP | 9-279398 A | 10/1997 |
| JP | 2006-183102 A | 6/1998 |
| JP | 2761751 B2 | 6/1998 |
| JP | 11-269685 A | 10/1999 |
| JP | 2000-226682 A | 8/2000 |
| JP | 2000-254650 A | 9/2000 |
| JP | 2004-35908 A | 2/2004 |
| JP | 2006-160543 A | 6/2006 |
| JP | 3893397 B2 | 3/2007 |
| JP | 2007-242433 A | 9/2007 |
| WO | 2004028966 A1 | 4/2004 |

OTHER PUBLICATIONS

Zhang, J.F. et al., "Steam Activation of Boron-Doped Diamond (BDD) Electrodes for Making Them Porous", Collected Abstracts, Autumn Convention on Electrochemistry in 2009. The Electrochemical Society of Japan. 10 pages.
Chapter 3, "Applied Electrical/Chemical Usage of Functional Diamond Membrane", Electrochemistry, vol. 67, No. 4, 1999, pp. 389-394.
G. Swain, "The Susceptibility to Surface Corrosion in Acidic Fluoride Media: A Comparison of Diamond, HOPG, and Glassy Carbon Electrodes", J. Electrochemical Society, vol. 141, No. 12, Dec. 1994, pp. 3382-3393.
H. Masuda et al., "Fabrication of a Nanostructured Diamond Honeycomb Film", Advanced Film, vol. 12, No. 6, 2000, pp. 444-447.
K. Honda et al., "Electrochemical properties of Pt-modified nano-honeycomb diamond electrodes", Journal of Electroanalytical Chemistry, vol. 514, 2001, pp. 35-50.

* cited by examiner

*Primary Examiner* — Bruce Bell
(74) *Attorney, Agent, or Firm* — Sughrue Mion, PLLC (57) ABSTRACT The present invention provides a process for producing an electrode for electrochemical reaction, wherein a conductive diamond layer is formed on an electrode substrate in the electrode; and the electrode substrate on which the conductive diamond layer is formed is kept at a temperature of 400° C. or more and 1,000° C. or less in a water vapor, thereby forming a micropore in the conductive diamond layer. Also, the present invention provides an electrode for electrochemical reaction obtained by the foregoing production process.

14 Claims, 4 Drawing Sheets

ELECTRODE FOR ELECTROCHEMICAL REACTION AND PRODUCTION PROCESS THEREOF

FIELD OF THE INVENTION

The present invention relates to a process for producing an electrode for electrochemical reaction, wherein the electrode has a high-quality conductive diamond layer which is porous and has a large effective surface area, and also, it relates to an electrode for electrochemical reaction capable of allowing an electrochemical reaction to efficiently proceed.

The present invention also relates to an electrode for electrochemical reaction having durability and capable of being stably used for electrolysis over a long period of time and a production process thereof. In more detail, the present invention relates to an electrode for plating or metal electrowinning which has durability and in particular, it relates to an electrode for electrochemical reaction having durability, which can be used in a strongly acidic bath under a high current density, such as high-speed zinc plating, electrolytic copper foil production, and which is able to make a formed metal, plated layer or copper foil substantially free from impurities thereon, and a production process thereof.

BACKGROUND OF THE INVENTION

An electrolysis process is a basic technology in which so far as an aqueous solution system is concerned, hydrogen, oxygen, ozone, hydrogen peroxide and the like can be generated by controlling a chemical reaction on the electrode surface by utilizing clean electric energy and which is used for various purposes including electrolysis of sodium chloride, electrolytic plating, metal electrowinning and the like as industrial electrolysis. In recent years, the electrolysis process is being utilized as a wastewater treatment because it is possible to indirectly decompose organic pollutants, or to adsorb the pollutants onto an electrode, thereby directly electrolyzing them.

In an oxidation reaction on an anode in the electrolysis, it is known that an oxidizing agent (effective chlorine, ozone, etc.) which is effective for the water treatment is formed; and that an active species such as an OH radical is also partially generated, and water containing the same is used for various purposes as a name such as active water, functional water, ion water or sterilized water. Such an electrolysis process is put to practical use. However, it has been pointed out that the objective reaction does not sufficiently proceed depending upon electrode materials. In general, according to an anodic oxidation reaction in electrolysis in an aqueous solution, electrolysis products resulting from water as a raw material are formed. However, in many cases, oxidation of other coexistent substances does not easily proceed in an electrode catalyst having high reactivity against discharge of water.

Examples of electrode (anode) catalyst materials for electrolysis for performing the oxidation include lead oxide, tin oxide, platinum group metals and oxides thereof, carbon and the like. Materials which can be used as an electrode substrate are required to have corrosion resistance from the viewpoint of a long life and such that contamination on the treated surface does not occur; and the anode substrate is limited to valve metals such as titanium, and alloys thereof, and the electrode catalyst is limited to noble metals such as platinum and iridium, and oxides thereof. However, it is known that even if such an expensive material is used, when a current is allowed to flow, the material is wasted according to the current density or time and flows out into the solution, so that electrodes having more excellent corrosion resistance are desired. Graphite or an amorphous carbon material has hitherto been used as an electrode material. However, such a material has exhaustion properties, and in particular, is conspicuously exhausted under anodic polarization.

On the other hand, diamond is excellent in thermal conductivity, optical permeability and durability against high temperatures and oxidation. In particular, since it is possible to control electric conductivity by doping, diamond has been regarded as promising as a semiconductor device or an energy conversion device. However, Patent Document 1 discloses an application of a diamond electrode, as a sensor, to which conductivity is imparted by ion injection.

Swain, et al. (Non-Patent Document 1) reported stability of diamond as an electrode for electrochemical reaction in an acidic electrolytic solution and suggested that the diamond is far excellent as compared with other carbon materials. Detailed descriptions regarding fundamental electrochemical characteristics are given in Non-Patent Document 2.

Patent Document 2 suggests that organic wastewater can be decomposed by using diamond as an anode material. Patent Document 3 proposes a method of electrochemically treating an organic material by using conductive diamond as an anode and cathode. Also, Patent Document 4 proposes a method of performing a water treatment by using a conductive diamond electrode as an anode and a gas diffusion cathode for generating hydrogen peroxide as a cathode.

Any industrial application in a high potential region in the case of a large current density has not been reported yet. However, Patent Document 5 reports that the diamond electrode is inert against a decomposition reaction of water; and that ozone is generated in addition to oxygen in an oxidation reaction. Patent Document 6 discloses that the diamond electrode can be utilized in electrolysis of a molten salt.

In the electrolysis process using diamond as an electrode for electrolysis, the reaction efficiency is enhanced as compared with the case using a conventional electrode. However, there was the case where the life is poor, so that the diamond electrode is unable to correspond thereto depending upon the application field.

As causes thereof, it may be estimated that since active sites of the diamond surface are small in the existing density as compared with other electrode materials and smooth in the geometrical shape (the electrochemical double-layer capacity of the diamond electrode is only about $1/100$ as compared with the electrochemical double-layer capacity of a platinum electrode), an actual current density increases as compared with a given current density, so that electrode depletion by electrolysis is easily caused.

In recent years, there has been devised a process of etching the diamond surface, on which a porous masking material is placed with oxygen plasma, thereby producing a diamond electrode having a honeycomb shape having pores of several ten nm and pitches of about 100 nm (depth: several µm) depending on the mask specifications (Non-Patent Document 3); and there has also been reported a technology in which other catalyst such as platinum is formed thereon (Non-Patent Document 4).

However, according to this method, it was difficult to apply them to industrial electrodes, and also, there was a limit in making the porosity finer. Under such circumstances, it has become necessary to further develop a porous diamond electrode which can be utilized for the industrial electrolysis.

Patent Document 7 discloses a production process of a diamond electrode having high electrode activity and a large number of micropores as compared with the conventional diamond electrodes. By thermally treating metal particles deposited on the diamond layer coated on the substrate surface in a reducing gas atmosphere, a carbon reduction reaction using the foregoing metal as a catalyst is allowed to proceed, thereby forming micropores on the surface of the diamond layer. Since the metal particles supported on the diamond layer surface are utilized, a diamond layer on which micropores are formed on an atomic level or a level close thereto, or diamond particles are obtained. The foregoing micropores are intended to increase the surface area of the diamond layer as a catalyst, thereby enhancing the catalytic activity. However, according to this process, it is necessary to deposit the metal particles on the diamond layer surface by a vapor deposition method or the like and also to perform the thermal treatment in a reducing gas atmosphere.

On the other hand, in high-speed zing plating, electrolytic copper foil production and the like which are represented by EGL (Electro Galvanizing Line), a so-called dimensionally stable electrode (DSE) obtained by coating a platinum group metal or an oxide thereon on the surface of a valve metal such as titanium, is used.

DSE is used for various purposes because it shows remarkably excellent stability as compared with other electrodes, is free from the contamination of impurities into the formed metal and has a high quality. It is known that this dimensionally stable electrode is used for electrolysis of sodium chloride and shows excellent stability. However, when the dimensionally stable electrode is used in a plating bath or the like, oxidative corrosion of titanium as a substrate proceeds, and nevertheless the coating layer of a platinum group metal oxide remains, the electrolysis cannot be performed. Therefore, countermeasures to these problems are important. For example, Patent Document 8 and Patent Document 9 disclose technologies in which an interlayer of a metal such as tantalum, or an alloy thereof or the like is formed between the substrate and the electrode active material, thereby improving durability of the electrode.

Patent Document 10 discloses a technology in which a diamond layer is formed as an interlayer on a substrate, and thereafter, a platinum group metal catalyst is formed. However, this diamond interlayer has a smoothly deposited structure, and in the case of forming the catalyst in this diamond interlayer, in particular, in the case of coating a precursor solution in which a catalyst raw material is dissolved on the substrate and forming a catalyst layer by a thermal treatment, since an adequate anchor is not formed, coating of the catalyst is difficult, and falling-off of the formed catalyst is easily caused. Thus, this technology was not put into practical use.

Patent Document 11 discloses that a large number of conductive diamond particles in which a carbon reactive catalytic metal is supported on micropores formed on the surface of the diamond particle is mixed with a binder to form an electrode catalyst for electrochemical reaction. This catalyst can be used as an oxygen electrode or a hydrogen electrode of a fuel cell. The metal catalyst supported within the micropore is higher in the catalyst stability (aggregation inhibition or falling-off prevention) than metal catalysts supported on the particle surface and high activity and long life can be achieved thereby with a small amount of the metal, so that the use amount of the expensive metal can be reduced. Though this patent document discloses a technology for forming the catalyst on the diamond particle, it does not describe an application to a large-sized electrode for industrial electrolysis.

CITATION LIST

Patent Documents

Patent Document 1: JP-A-58-160860
Patent Document 2: JP-A-7-299467
Patent Document 3: JP-A-2000-226682
Patent Document 4: JP-A-2000-254650
Patent Document 5: JP-A-11-269685
Patent Document 6: Japanese Patent No. 3893397
Patent Document 7: JP-A-2006-183102
Patent Document 8: Japanese Patent No. 2761751
Patent Document 9: Japanese Patent No. 2574699
Patent Document 10: JP-A-9-279398
Patent Document 11: JP-A-2007-242433

Non-Patent Documents

Non-Patent Document 1: Journal of Electrochemical Society, Vol. 131, 3382-(1994)
Non-Patent Document 2: Electrochemistry, Vol. 67, No. 4, p. 389 (1999)
Non-Patent Document 3: Adv. Mater., 6, 444 (2000)
Non-Patent Document 4: J. Electroanal. Chem., 514, 35 to 50 (2001)

SUMMARY OF THE INVENTION

According to the conventional diamond porosity treatment, sp2 carbon was not selectively reduced, so that the diamond quality was not improved. So far, there has not been found any industrial production process of a porous and high-quality diamond electrode. Therefore, extensive and intensive investigations were made regarding a production process and an electrode capable of achieving this.

An object of the present invention is to provide an electrode for electrochemical reaction which is able to solve the foregoing problems of the background and to make an electrode surface area large or enhance an adhesion strength to a catalyst layer to be coated and formed on the surface thereof, thereby achieving high durability, and a production process thereof. The present inventors have found that a diamond component is partially oxidized and removed at a high temperature in a water vapor, so that a fine porous layer can be formed. According to this, it has been confirmed that a diamond electrode with higher quality can be formed.

The present invention provides the following process for producing an electrode for electrochemical reaction and electrode for electrochemical reaction.

[1] A process for producing an electrode for electrochemical reaction, wherein a conductive diamond layer is formed on an electrode substrate in the electrode, and the electrode substrate on which the conductive diamond layer is formed is kept at a temperature of 400° C. or more and 1,000° C. or less in a water vapor, thereby forming a micropore in the conductive diamond layer.

[2] The process for producing an electrode for electrochemical reaction according to [1], wherein a catalyst layer of an electrode material having a platinum group metal and/or an oxide thereof is formed within and on the conductive diamond layer in which the micropore is formed.

[3] The process for producing an electrode for electrochemical reaction according to [1] or [2], wherein the electrode substrate is composed of a carbon or a valve metal selected among titanium, tantalum and niobium.

[4] The process for producing an electrode for electrochemical reaction according to any one of [1] to [3], wherein a representative diameter of the micropore is in a range of 1 nm or more and 1 µm or less.

[5] A process for producing a particle for an electrode for electrochemical reaction, wherein a conductive diamond particle is kept at a temperature of 400° C. or more and 1,000° C. or less in a water vapor, thereby forming a micropore in the conductive diamond particle.

[6] An electrode for electrochemical reaction, wherein an electrode substrate on which a conductive diamond layer is formed is kept at a temperature of 400° C. or more and 1,000° C. or less in a water vapor, thereby forming a micropore in the conductive diamond layer.

[7] An electrode for electrochemical reaction, wherein an electrode substrate on which a conductive diamond layer is formed is kept at a temperature of 400° C. or more and 1,000° C. or less in a water vapor, thereby forming a micropore in the conductive diamond layer, and a catalyst layer of an electrode material is formed on the conductive diamond layer.

According to the present invention, a porous conductive diamond layer can be formed, and this conductive diamond layer has a large surface area, and in consequence, an electrode for electrochemical reaction containing the same has a high quality. Thus, reaction efficiency increases, and stability is imparted. Since the treatment thereof can be conducted in a water vapor atmosphere at a high temperature, for example, time and cost can be greatly reduced as compared with the conventional treatment in a hydrogen gas stream.

Furthermore, when an electrode for electrochemical reaction in which a catalyst layer of an electrode material is formed within and on the conductive diamond layer, namely, an interlayer having a material having a conductive diamond structure having high quality and micropores is formed between an electrode substrate and the catalyst layer, the catalyst layer is firmly adhered to the interlayer due to an anchor effect of the micropores, so that even when used for electrolysis in a corrosive atmosphere, sufficient corrosion resistance is shown, and a stable electrolysis operation can be achieved over a long period of time.

Also, an actual current density is lowered due to an increase of the electrode surface area, and a low overvoltage can be realized. Thus, the economy is enhanced. The electrode of the present invention can be utilized not only for an application of electrolytic synthesis but as an electrode for electrochemical analysis because of its high sensitivity, and thus, it is not limited to the electrolysis field. The production process of the present invention can also be applied to large-sized electrodes, and the productivity is conspicuously enhanced.

DETAILED DESCRIPTION OF THE INVENTION

Details of the electrode for electrochemical reaction which is proposed in the present invention are described.

The electrode for electrochemical reaction of the present invention can be used for various electrolyses, and its application is not particularly limited. However, it can be preferably used for various platings (for example, high-speed zinc plating), metal electrowinning (electrolytic copper foil production), electrode of sodium chloride, organic electrolysis, ozone production, water treatment, electrolysis of a molten salt, fuel cell, sensor and the like.

The electrode for electrochemical reaction of the present invention is an electrode for electrochemical reaction comprising an electrode substrate and a conductive diamond layer which has micropores and is coated on the surface thereof; and an electrode for electrochemical reaction comprising an electrode substrate, a conductive diamond interlayer which has micropores and is coated on the surface of the electrode substrate and a catalyst layer coated on the interlayer.

Examples of a material of the electrode substrate include a valve metal selected among titanium, niobium and tantalum, silicon, carbon and the like. Such a material is used upon being processed into a particle, a fiber, a plate, a perforated plate, a wire net, a powdered sintered body, a metal fiber, a sintered body or the like. The electrode substrate may also work as a collector. In the case where the electrode for electrochemical reaction of the present invention is utilized for electrolytic oxidation with an electrolytic solution containing a corrosive component, it is desirable to use, as the substrate, niobium or tantalum which is strong in the corrosion resistance. It is also possible to use, as the substrate, a complex material prepared such that titanium is used as the substrate material, and a thin film of niobium or tantalum which is strong in the corrosion resistance is formed on the surface thereof.

The conductive diamond layer (interlayer) is formed by coating an electrode material having a conductive diamond structure directly on the surface of the substrate. However, for the purposes of enhancing adhesion between the material having a conductive diamond structure of the conductive diamond layer and the substrate and lowering an actual current density, it is preferable to perform roughing of the substrate surface. When used under a high-current density condition, it is desirable to use an alumina grid with about #20 or the like, thereby increasing the surface area; whereas when used under a relatively low current density under a corrosive condition, it is desirable to perform surface roughing using a fine alumina sand with from about #60 to 120, thereby enhancing the attachment of a diamond coating.

In this way, what the substrate surface of niobium or the like is polished is preferable because such contributes to an increase of the adhesion. On the occasion of polishing the substrate surface, to use a diamond powder as a polishing agent to impart them as a nucleus to the substrate or to perform a scratching treatment is effective for the growth of a uniform diamond layer (interlayer).

The material of the conductive diamond layer of the present invention is diamond which has been made conductive by being doped with impurities such as boron, phosphorus or graphite. Diamond in which a trace amount of graphite is partially coexistent in the diamond structure can also be utilized.

Diamond does not have conductivity singly. Therefore, as described previously, in general, impurities are incorporated into an organic material as a raw material, and diamond is attached onto the substrate together with the organic compound, thereby converting it into diamond with good conductivity. As the impurities, a simple substance composed of an element having a different valence from carbon, or a compound containing the same, for example, powdered boric acid (boron oxide), diphosphorus pentoxide or the like, can be used. Besides, diborane ($B_2H_6$) and phosphine ($PH_3$) can also be used as the impurities. However, since these materials are high in toxicity, it is desirable to use the foregoing powdered boric acid or diphosphorus pentoxide. A content of the impurities in the raw material organic compound is preferably from 1 to 10,000 ppm, and more preferably from 100 to 1,000 ppm. A resistivity can be controlled within the range of from 100 to 0.1 Ωcm.

As a formation method of the diamond layer, a hot filament CVD, a microwave plasma CVD, a plasma arc jet method, a PVD method and the like are developed. In order to obtain a powder, the conventional diamond powder synthesis method by an ultrahigh pressure (HPHT method) or plasma arc jet method is adopted.

The representative hot filament CVD method is hereunder described.

The inside of a reactor is made under a hydrogen gas stream, and $CH_4$, $CH_3OH$ or the like is fed as a carbon source. However, any organic compound which is vaporizable can be used without limitations. It is preferable that a concentration of the organic compound gas is from 0.1 to 5% by volume relative to hydrogen; and that a pressure within the apparatus is from 0.002 to 0.1 MPa.

For the reactor, a material having resistance to a hydrogen atmosphere and a high temperature is used. A filament temperature is set up at from 1,800 to 2,600° C. at which a carbon radical is formed, whereas the electrode substrate is placed in a temperature region (from 650 to 950° C.) at which diamond is deposited. As a filament material, Ta, W or the like is preferable.

The porosity treatment of the conductive diamond layer is performed by a method of performing heating at a temperature of from 400° C. to 1,000° C. under circulation of a water vapor.

It may be considered that a reduction reaction of diamond carbon by a water vapor proceeds as follows.

$$C+2H_2O \rightarrow CO_2+2H_2$$

As the reaction condition, an inert gas such as nitrogen is mixed with a water vapor prepared by heating liquid water are heated at an atmospheric pressure of 0.1 MPa, and a mixture thereof is fed into the reactor. A proportion of the water vapor is preferably in the range of from 5 to 95% by volume. Though the micropores increase or decrease depending upon the reaction time, in general, it is preferable to perform the treatment for from 1 to 10 hours. The treatment is performed at a temperature of from 400 to 1,000° C. Following the temperature increase, sp2 carbon, namely graphite-based carbon, vanishes, thereby a relative proportion of sp3 carbon, namely diamond-based carbon, increases.

A representative diameter of the micropore can be adjusted within the range of from 1 nm to 1 μm by selecting the condition. The representative diameter as referred to herein means a diameter represented by from −3σ to +3σ (σ: standard deviation) in the micropore diameter distribution. When the pore diameter is less than 1 nm, the electrolytic solution cannot penetrate, a remarkable improving effect regarding the application to the electrochemistry is not obtained, and furthermore, permeation of a catalyst precursor-containing solution as described later is limited, so that the catalyst is hardly formed. On the other hand, though it may be possible to form pores of more than 1 μm, a crystal size of the diamond layer on which micropores are formed is from 1 μm to 10 μm, and therefore, there is no meaning in practical use in utilizing the present invention. When a depth of the pore is more than 10 μm, a portion that does not effectively contribute to the electrochemical reaction is generated depending upon a ratio to the pore diameter. Also, there is a concern that a lowering of the mechanical strength is caused.

Also, it is preferable to improve joining properties to a thermally decomposed oxide as described later by subjecting porous diamond to an oxidation treatment, thereby terminating the surface thereof with oxygen.

Electron microscopic photographs of conductive diamond having micropores formed according to the present invention are shown in FIGS. 1 to 4. It is found that an infinite number of micropores which are not existent in a photograph of an untreated material in FIG. 5 are formed.

In this way, in the present invention, the conductive diamond layer is made porous by heating in a water vapor atmosphere. However, by jointly using other porosity method, the porosity of the conductive diamond layer can be more efficiently achieved.

For example, when a metal particle of cobalt, iron, nickel, titanium, tantalum, ruthenium, platinum, niobium, molybdenum, tungsten or an alloy thereof or the like is deposited on the surface thereof by means of a vapor deposition or thermal deposition method or the like simultaneously with or after the formation of the conductive diamond layer, the metal particle functions as a catalyst to promote a carbon reduction reaction (for example, a methane formation reaction) between the conductive diamond layer and hydrogen, thereby making the conductive diamond layer surface porous. By jointly using this porosity with a metal particle, a conductive diamond layer with a large degree of porosity is obtained as compared with the case of the single porosity.

The thus fabricated porous conductive diamond layer-containing electrode may be used as an electrode for electrochemical reaction using the conductive diamond layer as a catalyst for various applications as it is. However, when an electrode material layer of a metal or a metal oxide is coated on the conductive diamond layer surface, an electrode for electrochemical reaction with a higher performance can be provided.

The electrode material may be selected depending upon an application of the electrode for electrochemical reaction. Even if the durability is slightly inferior, since the penetration of an electrolytic solution or oxygen is suppressed by the interlayer having a material having the conductive diamond structure, the stable electrolysis operation can be continued over a long period of time. However, as a matter of course, it is desirable to use an electrode material having durability. It is preferable to use an electrode material comprising, as a main component, a platinum group metal such as platinum, palladium, iridium, ruthenium and rhodium. or an oxide thereof, for example, a complex oxide of iridium oxide and tantalum oxide. This electrode material may be coated on the interlayer surface by a thermal decomposition method which is usually adopted. For example, a solution of a mixture of iridium chloride and butyl tantalate is coated as a coating solution on the surface of the interlayer, followed by drying and decomposing by heating, and these operations are repeated as the need arises, thereby coating a desired amount of the electrode material. A preferred number of repeating is from 3 to 30, and a preferred coating amount is from 0.005 moles/m$^2$ to 0.5 moles/m$^2$.

The water vapor treatment according to the present invention can also be applied to granular conductive diamond. The obtained particles can be utilized for a fluidized bed or a fixed bed as it is, or these can be utilized in a mode molded in a sheet shape using a resin or the like.

Next, Examples regarding the electrode for electrochemical reaction and the production process thereof according to the present invention are described, but it should not be construed that the present invention is limited to these Examples.

EXAMPLES

The present invention will be illustrated in greater detail with reference to the following Examples and comparative Examples, but the invention should not be construed as being limited thereto.

Example 1

Diamond was deposited directly on a single-crystalline Si plate having a thickness of 1 mm as a substrate by using a hot filament CVD apparatus under the following conditions. The substrate surface was polished with a polishing agent composed of diamond fine particles (3 μm in diameter), thereby activating the surface and achieving nucleus formation, and the substrate was then installed in the hot filament CVD apparatus. Ethyl alcohol was used as a carbon source, and boron oxide wad dissolved therein in a concentration of 1,500 ppm. A hydrogen gas was allowed to flow at a rate of 0.01 L/min; a part thereof was by-passed into a carbon source container, thereby regulating the ethyl alcohol gas concentration to 0.5% by volume relative to hydrogen; a current was allowed to flow into the filaments while allowing these gases to flow into the apparatus; and the temperature was raised to 2,200 to 2,400° C. at which a carbon radical was formed. As a result of measuring the temperature of the substrate beneath the filaments, it was found to be 800° C. After the DVC operation was continued for 3 hours, the substrate was taken out.

The thus fabricated 5 μm-thick diamond electrode to which 1,500 ppm of boron added was treated at 700° C. for 2 hours in a nitrogen flow containing 10% of a water vapor at 0.1 MPa, thereby forming micropores on the electrode surface. As a result of observing the dimensions of the micropores by an electron microscopic photograph, the diameter was found to be from several ten nm to 100 nm (see FIG. 1).

Figure 7:
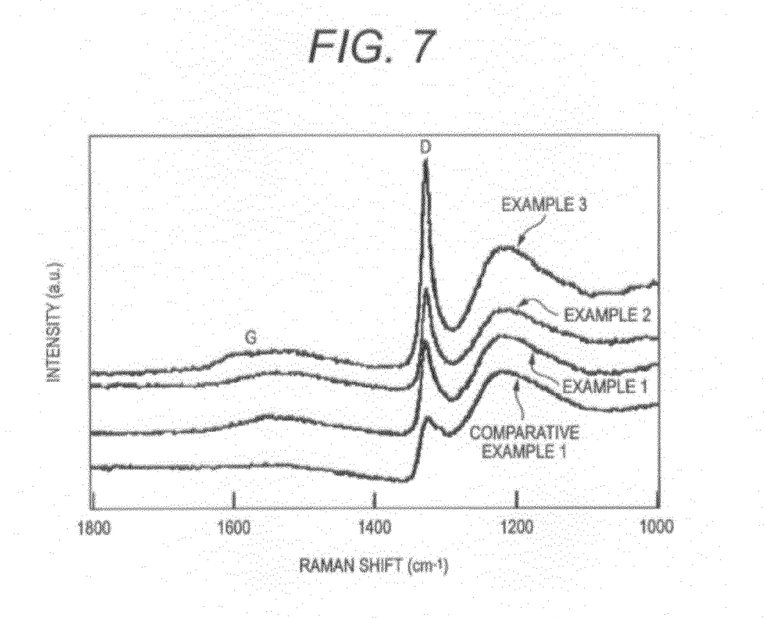
FIG. 7 is a graph showing the results of Raman spectroscopic measurement in Examples 1 to 3 and Comparative Example 1 (a G band represents the presence of a graphite component, and a D band represents the presence of a diamond component).

From a Raman spectrum before and after the formation of micropores (see FIG. 7), it was found that a diamond (D) peak at 1,330 cm$^{-1}$ did not largely change; whereas a G band caused by sp2 carbon reduced, graphite-shaped carbon existing in diamond was selectively varnished, and a D/G (diamond/graphite) ratio increased to 1.6 as compared with 1.45 of an electrode which had not been subjected to a water vapor treatment.

Figure 6:
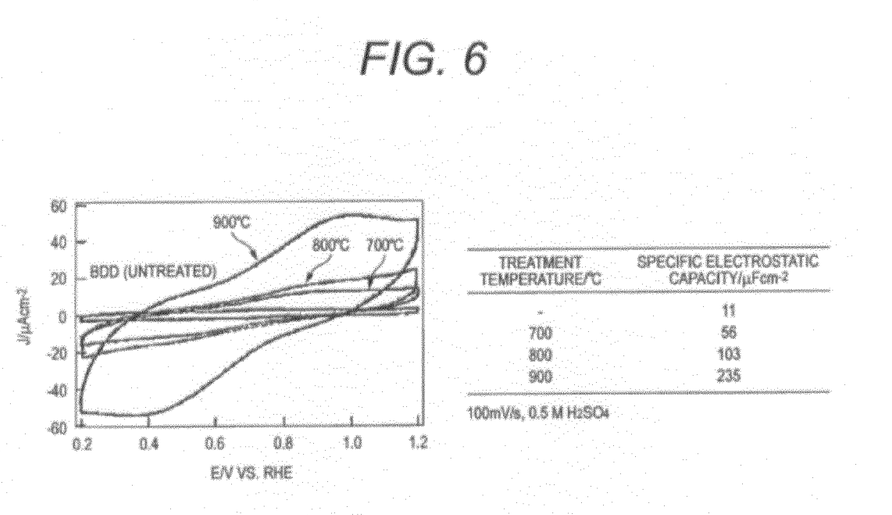
FIG. 6 is a graph showing the results of electrochemical measurement (cyclic voltammogram at 100 mV/s in 0.5 M sulfuric acid) in Examples 1 to 3 and Comparative Example 1.

The thus fabricated electrode was cut into an area of 1 cm$^2$ and used as an anode; a zirconium plate was used as a counter electrode; a distance between the electrodes was regulated to 1 cm; and electrolysis was performed using 0.5 M sulfuric acid under a condition at room temperature. As shown by "700° C." in a graph of FIG. 6, the results of the electrochemical measurement (cyclic voltammogram at 100 mV/s in 0.5 M sulfuric acid) reveal that an electrochemical double-layer capacity was 56 μg/cm$^2$. This value increases to about 5 times as compared with 11 μF/cm$^2$ of the electrode which had not been subjected to a water vapor treatment.

Example 2

A 5 μm-thick diamond electrode fabricated in the same manner as in Example 1 was treated at 800° C. for 2 hours in a nitrogen flow containing 10% of a water vapor at 0.1 MPa. As a result, pores having a diameter of from 0.1 μm to 1 μm were formed on the electrode surface (see an electron microscopic photograph of FIG. 2). From the Raman spectrum of FIG. 7, it was found that a G band caused by sp2 carbon reduced, graphite-shaped carbon existing in boron-doped diamond (BDD) was selectively varnished, and a D/G ratio increased to 1.9.

Electrolysis was performed in the same manner as in Example 1. As shown by "800° C." in the graph of FIG. 6, the results of the electrochemical measurement (cyclic voltammogram at 100 mV/s in 0.5 M sulfuric acid) reveal that an electrochemical double-layer capacity was 103 μF/cm$^2$. This value increases to 10 times as compared with 11 μF/cm$^2$ of the electrode which had not been subjected to a water vapor treatment.

Example 3

A 5 μm-thick diamond electrode fabricated in the same manner as in Example 1 was treated at 900° C. for 1 hour in a nitrogen flow containing 10% of a water vapor at 0.1 MPa. As a result, irregularities of from 0.1 μm to 1 μm were formed on the electrode surface (see an electron microscopic photograph of FIG. 3). From the Raman spectrum of FIG. 7, it was found that a G band caused by sp2 carbon reduced, graphite-shaped carbon existing in BDD was selectively varnished, and a D/G ratio increased to 2.15.

Electrolysis was performed in the same manner as in Example 1. As shown by "900° C." in the graph of FIG. 6, the results of the electrochemical measurement (cyclic voltammogram at 100 mV/s in 0.5 M sulfuric acid) reveal that an electrochemical double-layer capacity was 235 μF/cm$^2$. This value increases to 20 times as compared with 11 μF/cm$^2$ of the electrode which had not been subjected to a water vapor treatment.

Figure 1:
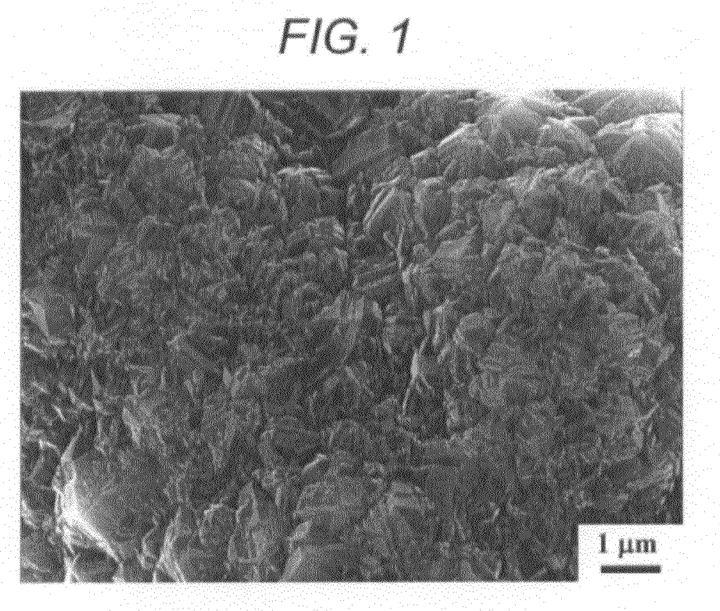
FIG. 1 is a scanning electron microscopic photograph of a porous diamond layer in Example 1 (at 700° C. for 2 hours).
Figure 2:
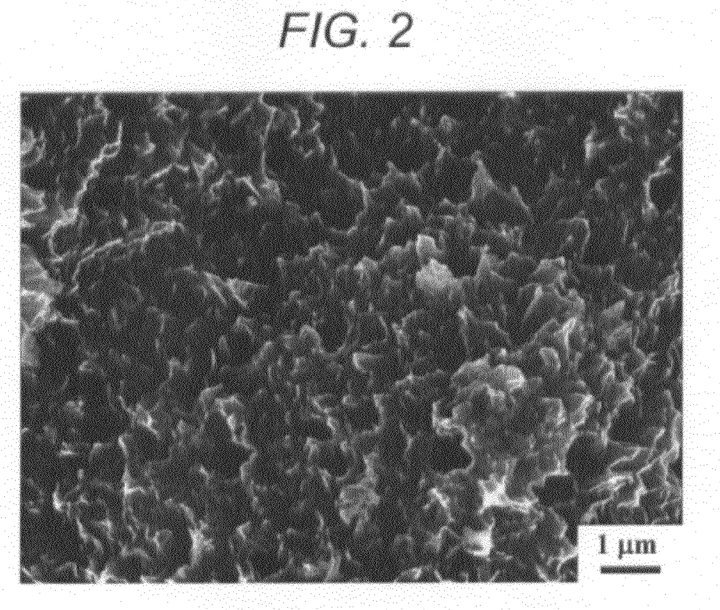
FIG. 2 is a scanning electron microscopic photograph of a porous diamond layer in Example 2 (at 800° C. for 2 hours).
Figure 3:
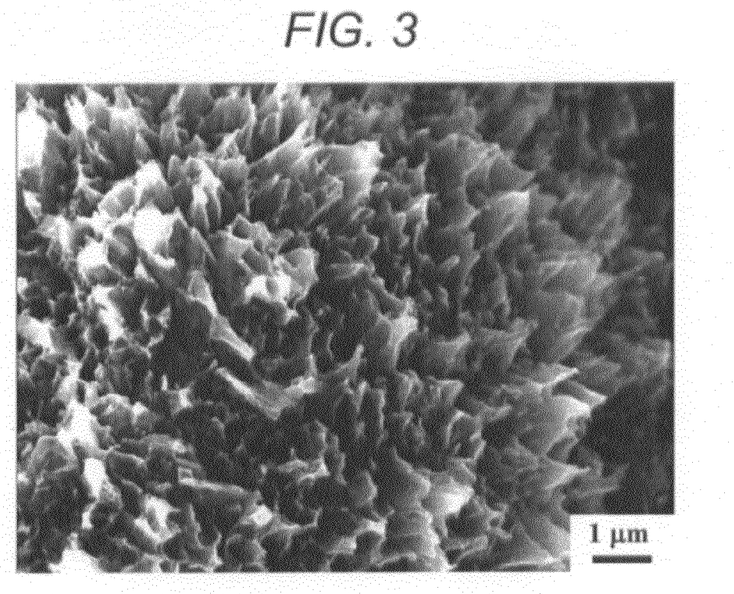
FIG. 3 is a scanning electron microscopic photograph of a porous diamond layer in Example 3 (at 900° C. for 1 hour).
Figure 4:
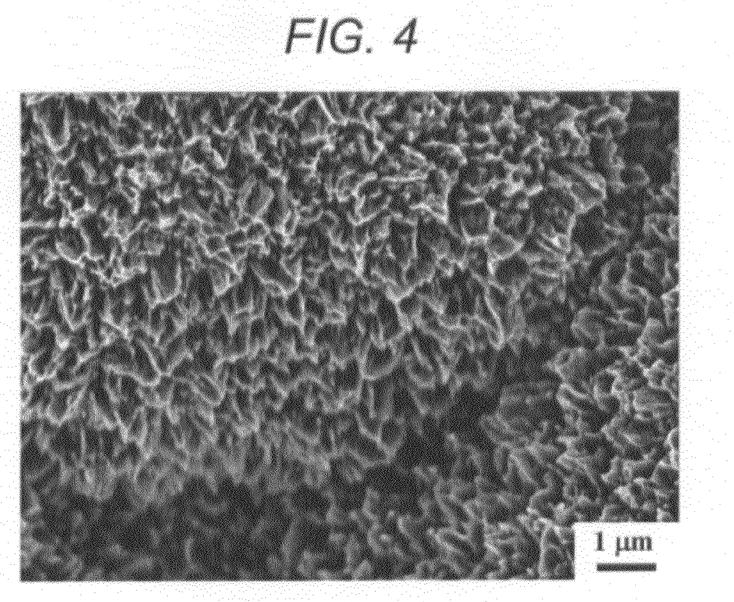
FIG. 4 is a scanning electron microscopic photograph of a porous diamond layer (at 900° C. for 2 hours).
Figure 5:
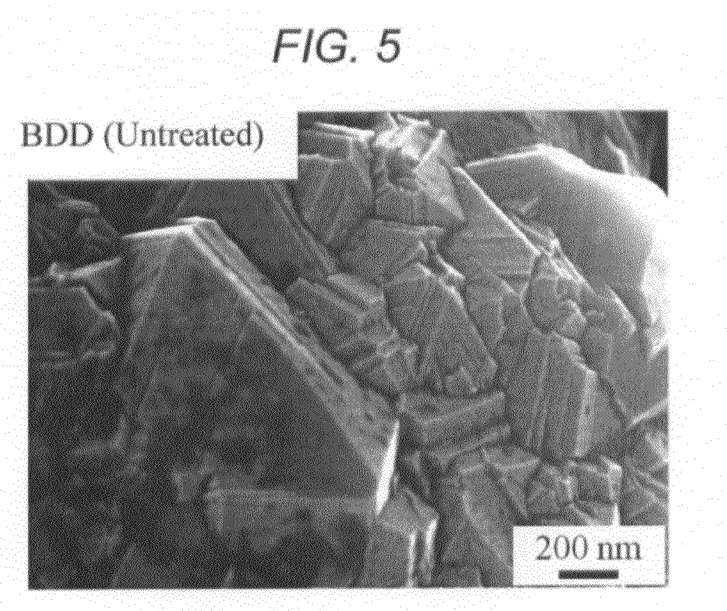
FIG. 5 is a scanning electron microscopic photograph of an untreated diamond layer in Comparative Example 1.

In this connection, an electron microscopic photograph of the surface state of an electrode obtained by a treatment at 900° C. for 2 hours in place of the foregoing treatment at 900° C. for 1 hour is shown in FIG. 4.

Comparative Example 1

An electrode for electrochemical reaction was fabricated in the same manner as in Example 1, except that the formation of micropores was not performed. As shown in an electron microscopic photograph of FIG. 5, the surface state reveals that micropores were not formed. Also, as shown by "BDD (untreated)" in the graph of FIG. 6, the results of the electrochemical measurement (cyclic voltammogram at 100 mV/s in 0.5 M sulfuric acid) reveal that an electrochemical double-layer capacity was 11 μF/cm$^2$; and that a D/G ratio was 1.45.

Example 4

A solution of a mixture of iridium chloride and butyl tantalate in a proportion of 2/1 in terms of a metal molar ratio in a mixed solvent of butyl alcohol and hydrochloric acid was prepared as a catalyst precursor solution. The catalyst precursor solution was coated on an Nb plate on which a diamond layer as fabricated in the same manner as in Example 1 is formed, followed by drying and decomposing in circulated air by heating at 500° C. for 10 minutes, and this was repeated 5 times, thereby coating an electrode material in an amount of 0.04 moles/m$^2$ in terms of iridium. The thus fabricated electrode was cut into an area of 1 cm$^2$ and used as an anode; a zirconium plate was used as a counter electrode; a distance between the electrodes was regulated to 1 cm; and electrolysis was performed using 150 g/L of sulfuric acid under a condition at 60° C. As a result, a stable cell voltage was kept at a current density of 5 A/cm² for 1,300 hours, so that it was confirmed that it is possible to perform the use over a long period of time.

Comparative Example 2

An electrode on which a catalyst layer is formed was fabricated in the same manner as in Example 4, except that the formation of micropores of the conductive diamond layer was not performed. As a result of performing electrolysis using this, after a lapse of 500 hours, separation of the catalyst layer coating, which may be considered to have been caused due to the corrosion of the substrate, occurred, so that the electrolysis could not be continued.

While the present invention has been described in detail and with reference to specific embodiments thereof, it will be apparent to one skilled in the art that various changes and modifications can be made therein without departing from the spirit and scope thereof.

This application is based on Japanese Patent Application No. 2010-051996 filed Mar. 9, 2010, and the contents thereof are herein incorporated by reference.

What is claimed is:

1. A process for producing an electrode for electrochemical reaction, wherein a conductive diamond layer is formed on an electrode substrate in the electrode, and the electrode substrate on which the conductive diamond layer is formed is kept at a temperature of 400° C. or more and 1,000° C. or less in a water vapor, thereby forming a micropore in the conductive diamond layer.

2. The process for producing an electrode for electrochemical reaction according to claim 1, wherein a catalyst layer of an electrode material having a platinum group metal and/or an oxide thereof is formed within and on the conductive diamond layer in which the micropore is formed.

3. The process for producing an electrode for electrochemical reaction according to claim 2, wherein the electrode substrate is composed of a carbon or a valve metal selected among titanium, tantalum and niobium.

4. The process for producing an electrode for electrochemical reaction according to claim 2, wherein a representative diameter of the micropore is in a range of 1 nm or more and 1 μm or less.

5. The process for producing an electrode for electrochemical reaction according to claim 1, wherein the electrode substrate is composed of a carbon or a valve metal selected among titanium, tantalum and niobium.

6. The process for producing an electrode for electrochemical reaction according to claim 5, wherein a representative diameter of the micropore is in a range of 1 nm or more and 1 μm or less.

7. The process for producing an electrode for electrochemical reaction according to claim 1, wherein a representative diameter of the micropore is in a range of 1 nm or more and 1 μm or less.

8. The process for producing an electrode for electrochemical reaction according to claim 7, wherein a representative diameter of the micropore is in a range of 1 nm or more and 1 μm or less.

9. A process for producing a particle for an electrode for electrochemical reaction, wherein a conductive diamond particle is kept at a temperature of 400° C. or more and 1,000° C. or less in a water vapor, thereby forming a micropore in the conductive diamond particle.

10. An electrode for electrochemical reaction, wherein an electrode substrate on which a conductive diamond layer is formed is kept at a temperature of 400° C. or more and 1,000° C. or less in a water vapor, thereby forming a micropore in the conductive diamond layer.

11. An electrode for electrochemical reaction, wherein an electrode substrate on which a conductive diamond layer is formed is kept at a temperature of 400° C. or more and 1,000° C. or less in a water vapor, thereby forming a micropore in the conductive diamond layer, and a catalyst layer of an electrode material is formed on the conductive diamond layer having the micropore formed therein.

12. The electrode for electrochemical reaction according to claim 11, wherein a solution of the electrode material is coated onto the conductive diamond layer having the micropore formed therein to obtain the catalyst layer of an electrode material.

13. The electrode for electrochemical reaction according to claim 11, wherein the catalyst layer of an electrode material is uniformly formed onto the conductive diamond layer having the micropore formed therein.

14. The electrode for electrochemical reaction according to claim 12, wherein the electrode material is uniformly coated onto the conductive diamond layer having the micropore formed therein.

* * * * *